(12) United States Patent
Dreher et al.

(10) Patent No.: US 6,617,387 B2
(45) Date of Patent: Sep. 9, 2003

(54) AMMONIA-FREE POLYMER DISPERSIONS AS ADDITIVES IN MINERAL BUILDING MATERIALS BASED ON HYDRAULIC BINDERS

(75) Inventors: Stefan Dreher, Neustadt (DE); Joachim Pakusch, Speyer (DE); Bernd Reck, Greunstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/931,889

(22) Filed: Aug. 20, 2001

(65) Prior Publication Data

US 2002/0049265 A1 Apr. 25, 2002

(30) Foreign Application Priority Data

Aug. 21, 2000 (DE) .......................... 100 40 825

(51) Int. Cl.$^7$ .............................. C04B 26/00
(52) U.S. Cl. ................ 524/510; 524/828; 524/556; 524/566; 524/492; 524/523; 524/458; 525/227; 525/221; 525/229; 526/318.4; 526/318.6; 264/333
(58) Field of Search ................. 524/510, 828, 524/556, 566, 492, 523, 458, 560, 819; 525/227, 221, 229; 526/318.4, 318.6; 264/333

(56) References Cited

U.S. PATENT DOCUMENTS

| 4,002,713 A | * | 1/1977 | Duncan et al. ............. 264/234 |
| 5,225,478 A | * | 7/1993 | Beckerle et al. ............ 524/510 |
| 5,576,378 A |   | 11/1996 | Kuhlmann et al. |
| 5,703,156 A | * | 12/1997 | Sauer ........................ 524/802 |

FOREIGN PATENT DOCUMENTS

| EP | 537 411 | 4/1993 |
| JP | 63-055143 | 3/1988 |
| JP | 63-156048 | 6/1988 |
| JP | 64-5935 | 1/1989 |

OTHER PUBLICATIONS

Derwent Publications, JP 59 146963, Aug. 23, 1984.
Derwent Publications, AT 359 904, corr. DT 2827–382, Jan. 18, 1979.

* cited by examiner

Primary Examiner—David W. Wu
Assistant Examiner—Satya B Sastri
(74) Attorney, Agent, or Firm—Oblon, Spivak, McClelland, Maier & Neustadt, P.C.

(57) ABSTRACT

Ammonia-free polymer dispersions containing at least one copolymer which contains, as polymerized monomers,
a) from 40 to 80% by weight of at least one ester of acrylic acid with $C_2$–$C_{12}$-alkanols,
b) from 10 to 40% by weight of at least one vinylaromatic monomer and/or at least one ester of methacrylic acid with $C_1$–$C_4$-alkanols,
c) from 2 to 15% by weight of at least one monoester of a $C_2$–$C_{10}$-alkanediol with acrylic acid or methacrylic acid,
d) not more than 1% by weight of ethylenically unsaturated monomers which have at least one acid group, or salts thereof,
e) less than 5% by weight of $\alpha,\beta$-ethylenically unsaturated nitrites and
f) less than 1% by weight of amides of $\alpha,\beta$-ethylenically unsaturated mono- and dicarboxylic acids, and the polymer powders or polymer granules obtainable from the polymer dispersion, are used as additives for building materials based on hydraulic binders. The building materials based on hydraulic binders and binder formulations which contain these polymers and a process for improving the mechanical strength, elasticity and processibility of building materials based on hydraulic binders are also described.

12 Claims, No Drawings

AMMONIA-FREE POLYMER DISPERSIONS AS ADDITIVES IN MINERAL BUILDING MATERIALS BASED ON HYDRAULIC BINDERS

The present invention relates to ammonia-free polymer dispersions, polymer powders and granules obtained from the polymer dispersions, as additives in building materials based on hydraulic binders.

Hydraulic binders are understood as meaning mineral substances which are processed together with water and, if required, additives and conventional assistants to give a material which is plastic in the moist state and which, when left alone in the air or under water, with or without the action of elevated temperatures, solidifies to a stone-like substance after a certain time. Examples of hydraulic binders are cement, gypsum, lime and clay.

The use of polymer dispersions or the polymer powders or granules obtainable therefrom for improving the properties of building materials based on hydraulic binder is known in principle. Polymer dispersions for use with hydraulic binders have, as a rule, a high content of polar and/or ionic auxiliary monomers such as (meth)acrylic acid and (meth)acrylamide and a high content of emulsifiers. These measures are intended to improve the stability of the dispersions in the presence of the hydraulic binders, since the high electrolyte content of the hydraulic binders leads to considerable destabilization of disperse systems.

In order to increase the mechanical strength of building materials based on hydraulic binders in the hardened state, polymer dispersions whose polymers have a high glass transition temperature ($T_g$) are frequently used. Thus, EP-A-537 411 describes the use of polymer dispersions having a $T_g$ of >+30° C. as additives for cement. The addition is intended to improve the strength of cement-bonded materials and to increase the open time.

JP-59 146 963 likewise describes polymer dispersions having a high glass transition temperature for this application. These contain more than 90% of a hard monomer, for example styrene, methyl methacrylate, acrylonitrile or vinyl chloride, and only from 0.02 to 10% of a hydrophilic comonomer, such as acrylamide, sodium styrenesulfonate, hydroxyethyl methacrylate or sodium vinylsulfonate. The use of these dispersions as additives for cement leads to cement-containing building materials having higher water resistance and in some cases improved compressive strength.

Building materials based on hydraulic binders which contain such polymer dispersions are comparatively brittle and exhibit in particular poor low-temperature flexibility. This presumably is due to the fact that, owing to the high $T_g$ of the polymer, no film formation of the latex particles takes place in the building materials.

In order to reduce the brittleness and increase the low-temperature flexibility of hardened building materials based on hydraulic binders, polymer dispersions which contain polymers having a low $T_g$ are therefore used. Thus, AT-359 904 describes the use of polymer dispersions having a $T_g$ of from −70 to −8° C. as additives for cement-containing building materials. It is said that mortars which have good low-temperature flexibility after hardening are obtained as a result of adding from 3 to 35% by weight of such dispersions. However, the addition of these dispersions leads to building materials having low strength.

JP-63 055 143 and JP-64 5935 describe polymer dispersions which contain a polymer comprising from 55 to 90% by weight of a $C_4$–$C_8$-alkyl acrylate, from 5 to 40% by weight of acrylonitrile and/or styrene, from 1 to 10% by weight of acrylic and/or methacrylic acid and from 1 to 10% by weight of at least one 2-hydroxyethyl or 2-hydroxypropyl (meth)acrylate and/or (meth)acrylamide, which polymer is prepared by emulsion polymerization in the presence of a nonionic emulsifier. The use of these polymer dispersions leads to building materials having higher flexibility and less tendency to crack. However, more than 40% by weight of polymer dispersion have to be added. The building materials thus obtained have an unsatisfactorily high water absorption and often have an unpleasant odor. This is presumably due to gaseous ammonia which forms as a result of partial hydrolysis of the polymer.

JP-63 156 048 recommends the use of polymer dispersions which contain as polymerized units, from 2 to 10% by weight of unsaturated monomers having hydroxyl groups and from 30 to 98% by weight of alkyl acrylates without hydroxyl groups and which are essentially free of unsaturated carboxylic acids and carboxamides. The use of these dispersions in cement-containing materials leads to good adhesion and higher mechanical stability. The electrolyte stability of these polymer dispersions and hence their stability in cement-containing material is however insufficient. Moreover, the addition of these dispersions results in an unpleasant odor of the polymer-modified cement-containing material, which is presumably due to the liberation of the ammonia used for neutralizing the dispersions.

It is an object of the present invention to provide aqueous polymer dispersions which have high shear stability and electrolyte stability and, when added to building materials based on hydraulic binders, lead to improved mechanical properties of the building materials in the hardened state. In particular, the dispersions should lead to building materials which have good processibility and at the same time high flexibility, in particular at low temperatures, and strengths. The polymer should have a neutral odor in the presence of the hydraulic binders.

We have found that this object is achieved by aqueous, ammonia-free polymer dispersions which contain at least one copolymer which contains, as polymerized monomers,
a) from 40 to 80% by weight of at least one ester of acrylic acid with $C_2$–$C_{12}$-alkanols,
b) from 10 to 40% by weight of at least one vinylaromatic monomer and/or at least one ester of methacrylic acid with $C_1$–$C_4$-alkanols,
c) from 2 to 15% by weight of at least one monoester of a $C_2$–$C_{10}$-alkanediol with acrylic acid or methacrylic acid,
d) not more than 1.0% by weight of ethylenically unsaturated monomers which have at least one acid group, or salts thereof,
e) less than 5% by weight of ethylenically unsaturated nitrites and
f) less than 1% by weight of amides of α,β-ethylenically unsaturated mono- and dicarboxylic acids.

The present invention accordingly relates to building materials based on hydraulic binders as an additive which contain at least one copolymer in the form of an ammonia-free aqueous polymer dispersion as defined above. The copolymer contained in the novel polymer dispersions acts as a film-forming component. In the context of this invention, building materials based on hydraulic binders are both the hydraulic binders themselves and building materials which contain at least 5, in particular 10, particularly preferably at least 25, % by weight of at least one hydraulic binder based on the total weight of hydraulic binders and additives. The use in building materials which contain cement as a binder is preferred.

The building materials based on hydraulic binders are generally converted into a processible form, mostly in the form of liquid or plastically deformable materials, by adding water (mixing water) and, if required, conventional mineral and/or nonmineral additives. These materials generally harden in the course of time when left to stand. Typical building materials based on hydraulic binders, which are processed in this manner, are cement, mortar, renders, tile adhesives, mineral sealing slurries, concrete and the like. These building materials differ essentially in the amount and type of the additives present and/or the water content during use in construction.

According to the invention, a polymer dispersion as described herein is added to the building materials based on hydraulic binders. The addition can be effected, for example, during conversion of the building materials into the processible form, for example by replacing at least a part of the mixing water with a polymer dispersion as described here. The novel use of the polymer dispersion can also be effected in the form of powder or granules obtained by drying the dispersion. These powders or granules may be added to the building materials based on hydraulic binders both in the dry state (i.e. before the addition of water) and during or after the addition of water.

All stated amounts with respect to the hydraulic binders and the building materials based on hydraulic binders relate to their solids content, unless stated otherwise. The solids content of the hydraulic binders and of the building materials based on hydraulic binders can be determined by drying for 24 hours at 120° C. The mineral fraction is understood as meaning the dry solids of the building material, i.e. the total of hydraulic binder and conventional additives without organic substances or porous substances. In most cases, the mineral fraction of the building materials based on hydraulic binder can be determined by ignition of an uncomminuted or comminuted sample of the building materials.

All stated amounts which relate to the polymer dispersions to be used according to the invention and their components, in particular the copolymer, the emulsifier and, if required, the assistants present, are calculated as solid, unless stated otherwise. The solids contents of the polymer dispersions and of the liquid dispersion components, for example, of the generally aqueous solutions of the emulsifiers, can be determined by drying at 120° C. to constant weight.

Preferably, the copolymer dispersed in water is present as polymer particles having mean particle sizes of from 50 to 1 000 nm, in particular from 50 to 500 nm, particularly preferably from 60 to 300 nm. The copolymer contains ethylenically unsaturated monomers as polymerized units. The stated amounts of the polymerized monomers are 100% by weight in total. The mean particle sizes are established in a known manner, for example by initially taking a seed latex, by means of a seed latex formed in situ at the beginning of the polymerization, by means of the emulsifier concentration or by a combination of these measures.

Preferably, the copolymer contains, as polymerized monomers, from 55 to 80, particularly preferably from 60 to 76, % by weight of at least one ester of acrylic acid with $C_2$–$C_{12}$-alkanols. Suitable $C_2$–$C_{12}$-alkanols are linear $C_2$–$C_{12}$-alkanols, branched $C_3$–$C_{12}$-alkanols and $C_5$–$C_{10}$-cycloalkanols. Linear or branched $C_2$–$C_8$-alkanols-are particularly suitable. Examples of monomers a) are ethyl acrylate, n-propyl acrylate, isopropyl acrylate, n-butyl acrylate, sec-butyl acrylate, tert-butyl acrylate, 3-methylbutyl acrylate, 2-methylbutyl acrylate, n-pentyl acrylate, n-hexyl acrylate, cyclohexyl acrylate, 2-ethylhexyl acrylate, n-octyl acrylate, n-decyl acrylate, 2-propylheptyl acrylate, isobornyl acrylate, norbornyl acrylate, 4-tert-butyl-cyclohexyl acrylate and 2,3,5-trimethylcyclohexyl acrylate. Ethyl acrylate, n-butyl acrylate and 2-ethylhexyl acrylate and mixtures thereof are particularly preferred.

Preferably, the copolymers contain as monomers b), from 12 to 35, particularly preferably from 15 to 30, % by weight of at least one monounsaturated vinylaromatic monomer and/or at least one methacrylic ester of $C_1$–$C_4$-alkanols. Suitable vinylaromatics are styrene, α-methylstyrene, α-phenylstyrene, o-chlorostyrene, vinyltoluenes and mixtures thereof. A particularly preferred vinylaromatic is styrene. Suitable methacrylic esters of $C_1$–$C_4$-alkanols are, for example, methyl methacrylate, ethyl methacrylate, n-propyl methacrylate, isopropyl methacrylate, n-butyl methacrylate, sec-butyl methacrylate and tert-butyl methacrylate, among which methyl methacrylate is preferred. Very particularly preferred monomer b) is styrene.

The monomers a) and b) (principal monomers) together generally account for from 80 to 98, preferably from 85 to 98, particularly preferably from 90 to 97, % by weight of all polymerized monomers. Particularly preferred monomer combinations of monomers b) and monomers a) are the combinations styrene/n-butyl acrylate, styrene/n-butyl acrylate/2-ethylhexyl acrylate, styrene/2-ethylhexyl acrylate, methyl methacrylate/n-butyl acrylate, methyl methacrylate/n-butyl acrylate/2-ethylhexyl methacrylate, methyl ethacrylate/2-ethylhexyl acrylate, styrene/methyl methacrylate/n-butyl acrylate, and styrene/methyl methacrylate/n-butyl acrylate/2-ethylhexyl acrylate.

For example, the following are preferred for the use according to the invention:
copolymers which contain, as principal monomers, styrene and at least one ester of acrylic acid, selected from n-butyl acrylate, 2-ethylhexyl acrylate and ethyl acrylate; or
copolymers which contain, as principal monomers, methyl methacrylate and at least one ester of acrylic acid, selected from n-butyl acrylate and 2-ethylhexyl acrylate.

Preferably, the copolymer contains, as polymerized monomers c), from 3 to 12, particularly preferably from 3 to 9, % by weight of at least one monoester of a $C_2$–$C_{10}$-alkanediol with acrylic acid or methacrylic acid. Suitable alkanediols are linear $C_2$–$C_{10}$-alkanediols, branched $C_3$–$C_{10}$-alkanediols and $C_5$–$C_{10}$-cycloalkanediols, preferably linear $C_2$–$C_6$-α,ω-alkanediols. Examples of suitable monomers c) are hydroxyethyl acrylate, hydroxyethyl methacrylate, 3-hydroxypropyl acrylate, 3-hydroxypropyl methacrylate, 2-hydroxypropyl acrylate, 2-hydroxypropyl methacrylate, 4-hydroxybutyl acrylate and 4-hydroxybutyl methacrylate.

According to the invention, the copolymer contains, as polymerized monomers d), not more than 1.0% by weight of ethylenically unsaturated monomers which have at least one acid group, for example a carboxyl group or a sulfo group, or of salts thereof. Preferably, the copolymer therefore contains either from 0.1 to 1.0, in particular from 0.2 to 1, particularly from 0.2 to 0.8, % by weight of at least one monomer d) as polymerized units, or it is essentially free of polymerized monomers d) (amount by weight <0.1, particularly <0.05, particularly preferably <0.01 or 0, % by weight). Suitable monomers d) are α,β-ethylenically unsaturated $C_3$–$C_6$-monocarboxylic acids, such as acrylic acid or methacrylic acid, and monoethylenically unsaturated $C_4$–$C_8$-dicarboxylic acids, such as maleic acid, fumaric acid, itaconic acid and citraconic acid. Suitable monomers d) are furthermore ethylenically unsaturated monomers which contain a sulfo group, such as vinylsulfonic acid, 2-acrylamido- 2-methylpropanesulfonic acid, 2-acryloyloxyethanesulfonic acid and 2-methacryloyloxyethanesulfonic acid, salts thereof, preferably ammonium salts thereof, in particular ammonium salts of amines which are not volatile at room temperature, and preferably alkali metal salts thereof, in particular sodium salts thereof. Acrylic acid and methacrylic acid are preferred.

The copolymers preferably contain less than 4% by weight of ethylenically unsaturated nitriles, such as acrylonitrile or methacrylonitrile. Particularly preferably, the copolymers are essentially free of such nitriles or contain them in an amount of from 0.1 to not more than 3.5% by weight. A low content of polymerized nitriles is advantageous for low water absorption of the novel modified building materials.

The copolymers preferably contain less than 0.5% by weight of amides of $\alpha,\beta$-ethylenically unsaturated mono- and dicarboxylic acids. Particularly preferably, the polymer dispersions used according to the invention are free or essentially free of amides of carboxylic acids. A very low content of amides of $\alpha,\beta$-ethylenically unsaturated carboxylic acids is advantageous for ensuring that the novel dispersions produce little odor in the presence of the hydraulic binders.

In addition, the copolymers may contain small amounts of further monomers, as usually used in the preparation of aqueous polymer dispersions.

Suitable further comonomers are, for example, silicon-containing monomers, in particular silyl-containing monomers, such as vinyltrialkoxysilanes, e.g. vinyltrimethoxysilane, alkylvinyldialkoxysilanes or (meth)acryloyloxyalkyltrialkoxysilanes, e.g. (meth)acryloyloxyethyltrimethoxysilane, (meth)acryloyloxypropyltrimethoxysilane and trimethoxysilylpropyl methacrylate, glycidyl-containing monomers, in particular glycidyl (meth)acrylate, glycidyl vinyl ether, monomers containing 1,3-diketo groups, in particular acetoxyethyl (meth)acrylate and diacetone(meth)acrylamide, monomers containing urea groups, such as ureidoethyl (meth)acrylate, acrylamidoglycolic acid and methyl methacrylamidoglycolate.

If these further comonomers are contained in the polymer dispersions to be used according to the invention, they are as a rule present as polymerized units in the copolymers in amounts of from 0.1 to 10, preferably not more than 5, % by weight.

Very particularly preferred copolymers are those which contain, as polymerized units, a) from 55 to 80, in particular from 60 to 76, % by weight of at least one monomer a), selected from ethyl acrylate, n-butyl acrylate and 2-ethylhexyl acrylate, b) from 12 to 35, in particular from 15 to 30, % by weight of styrene and/or methyl methacrylate, c) from 3 to 12, in particular from 3 to 9, e.g. about 4, about 6 or about 8, % by weight of at least one monoester of a $C_2$–$C_6$-alkanediol, preferably $C_2$–$C_4$-alkanediol, with acrylic acid or methacrylic acid, preferably with acrylic acid, and, if required, d) up to 1, preferably from 0.1 to 1, in particular from 0.2 to 1, % by weight of at least one ethylenically unsaturated carboxylic acid selected from acrylic acid, methacrylic acid, maleic acid and itaconic acid, preferably from acrylic acid and methacrylic acid.

Particularly preferably, the copolymers are furthermore free of primary amido groups and/or nitrile groups. In another embodiment, the copolymer contains no monomers d) containing acid groups and contains the abovementioned monomers a), b) and c) in the abovementioned amounts and preferably in the amounts stated as being preferred.

In the preferred embodiment of the present invention, the copolymer contains exclusively vinylaromatics, in particular styrene, as monomer b). This applies in particular when the copolymer is essentially free of polymerized ethylenically unsaturated monomers which have at least one acid group (monomers d).

The copolymers used are known, are commercially available or can be prepared by known methods.

The copolymers are prepared as a rule by means of free radical, aqueous emulsion polymerization in the presence of at least one free radical polymerization initiator and, if required, one or ore surfactants.

The aqueous emulsion polymerization can be carried out in a conventional manner, for example as described in "Encyclopedia of Polymer Science and Technology", Vol. 5, Wiley & Sons Inc., NY 1966, page 847. Copolymers dispersed in water in the form of multiphase particles may also be used. They can be prepared, for example, by sequential methods, as described, for example, in EP-555 959, EP-308 753 and EP-654 454.

The polymerization is carried out in a conventional manner in the presence of compounds forming free radicals (initiators). Preferably from 0.05 to 10, particularly preferably from 0.2 to 5, % by weight, based on the monomers used in the polymerization, of these compounds are required.

It is also possible to use higher molecular weight polymers which have been prepared by polymerization in the presence of conventional crosslinking agents. Suitable crosslinking agents are known to the person skilled in the art, for example from DE 197 29 161.9, which is hereby fully incorporated by reference.

Surfactants suitable for carrying out the emulsion polymerization are the protective colloids and emulsifiers usually used for these purposes. The surfactants are usually used in amounts of up to 10, preferably from 0.1 to 7.5, in particular from 1 to 5, % by weight, based on the monomers to be polymerized.

Suitable protective colloids are, for example, polyvinyl alcohols, starch derivatives and cellulose derivatives or vinyl-pyrrolidone-containing copolymers. A detailed description of further suitable protective colloids is to be found in Houben-Weyl, Methoden der organischen Chemie, Volume XIV/1, Makromolekylare Stoffe, Georg-Thieme-Verlag, Stuttgart 1961, pages 411–420. Mixtures of emulsifiers and/or protective colloids may also be used.

Preferably, no protective colloids are used in the preparation of the copolymers. If the polymer dispersions contain protective colloids, they are preferably not added until after the preparation of the polymer dispersion.

Particularly preferably used surfactants are exclusively emulsifiers whose relative molecular weights, in contrast to the protective colloids, are usually less than 2 000. They may be anionic, cationic or nonionic. The emulsifiers used for the purposes of this invention are preferably nonionic or anionic emulsifiers. While the nonionic emulsifiers are generally nonionic alkoxylated emulsifiers, in the case of the anionic emulsifiers a distinction is made below between anionic nonalkoxylated emulsifiers and anionic alkoxylated emulsifiers.

The anionic nonalkoxylated emulsifiers include alkali metal and ammonium salts of alkylsulfates (alkyl radical: $C_8$–$C_{40}$), for example of sulfuric monoesters of $C_8$–$C_{22}$-fatty alcohols or of $C_8$–$C_{32}$-oxo alcohols, of alkylsulfonic acids (alkyl radical: $C_{12}$–$C_{18}$), of di-$C_6$–$C_{25}$-alkyl sulfosuccinates and of alkylaryl-sulfonic acids (alkyl radical: $C_6$ to $C_{32}$), for example $C_6$–$C_{32}$-alkylphenols. Further suitable emulsifiers are described in Houben-Weyl, Methoden der organischen Chemie, Volume XIV/1, Makromolekylare Stoffe, Georg-Thieme-Verlag, Stuttgart, 1961, pages 192–208.

The anionic nonalkoxylated emulsifiers also include compounds of the formula I

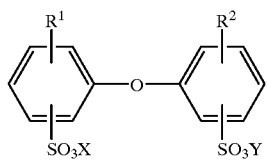

where $R^1$ and $R^2$ are each hydrogen or $C_4$–$C_{24}$-alkyl and are not simultaneously hydrogen, and X and Y may be alkali metal ions and/or ammonium ions. X and Y are preferably sodium, potassium or ammonium, sodium being particularly preferred. Frequently, industrial mixtures which contain from 50 to 90% by weight of the monoalkylated product, for example Dowfax® 2A1 (trademark of Dow Chemical Company), are used. The compounds I are generally known, for example from U.S. Pat. No. 4,269,749, and are commercially available.

Polymer dispersions which contain alkoxylated emulsifiers, in particular nonionic alkoxylated emulsifiers and/or anionic alkoxylated emulsifiers, are advantageous for the novel use. The alkoxylated emulsifiers improve both the handling properties of the copolymers to be used according to the invention, for example the miscibility and processibility of copolymer and hydraulic binder, and the compatibility of the polymer with the hydraulic binder, and the handling properties and mechanical properties of the hydraulic binder modified with the copolymer.

Alkoxylated emulsifiers are emulsifiers which have oligoalkylene oxide or polyalkylene oxide units in the hydrophilic moiety. Usually, alkoxylated emulsifiers are obtained by reacting lipophilic compounds or compounds which have lipophilic groups with alkylene oxides, in particular ethylene oxide and/or propylene oxide. Such alkoxylated emulsifiers may additionally be modified with ionic, in particular anionic, groups. Accordingly, a distinction is made between anionic alkoxylated emulsifiers, which have at least one anionic or one anionogenic group, and nonionic alkoxylated emulsifiers which have no such group.

Examples of lipophilic compounds or compounds which have lipophilic groups are aliphatic, aromatic and/or aromatic-aliphatic alcohols, amides, amines and carboxylic acids and derivatives thereof. Preferably, the lipophilic compounds or compounds which have lipophilic groups are selected from fatty acids, fatty alcohols, oxo alcohols, the amines, amides and salts derived from them, phenols, alkylphenols, hydroxy- and amino-naphthalenes, dicarboxylic acids and their esters or monoesters and lipophilic polyalkylene oxides carrying at least one hydroxyl group or polyalkylene oxides having lipophilic segments, for example polypropylene oxide, polybutylene oxide and random copolymers or block copolymers of ethylene oxide, propylene oxide and/or butylene oxide.

The degree of alkoxylation of such alkoxylated emulsifiers is as a rule from 2 to 150, preferably from 3 to 100, particularly preferably from 4 to 50.

Examples of preferred nonionic aliphatic alkoxylated emulsifiers are ethoxylated and ethoxylated/propoxylated, preferably ethoxylated, $C_6$–$C_{32}$-fatty alcohols and amines, $C_6$–$C_{60}$-oxo alcohols and amines, linear primary $C_6$–$C_{60}$ Ziegler alcohols, fatty acid alkylolamides, fatty acids and fatty acid amides which have a degree of alkoxylation of from 3 to 100, preferably from 4 to 50, and polyalkylene oxide adducts, such as ethylene oxide/propylene-oxide block copolymers.

Preferred nonionic aliphatic alkoxylated emulsifiers are selected from ethoxylated $C_6$–$C_{32}$-fatty alcohols, preferably $C_8$–$C_{20}$-fatty alcohols, in particular $C_9$–$C_{16}$-fatty alcohols, for example fatty alcohols which are predominantly not highly branched and which are obtainable by reduction of naturally occurring fatty acids, and ethoxylated $C_6$–$C_{32}$-oxo alcohols, free $C_8$–$C_{20}$-oxo alcohols, in particular $C_9$–$C_{16}$-oxo alcohols, which are generally more highly branched compared with the fatty alcohols and have an average degree of ethoxylation of from 2 to 150, preferably from 4 to 50, in particular from 6 to 30, for example from 8 to 15 or from 12 to 25. Examples of preferred nonionic aliphatic alkoxylated emulsifiers are ethoxylated lauryl alcohol having a degree of ethoxylation of from 4 to 50, in particular from 8 to 25, such as the Lutensol grades LUTENSOL® AT18 and AT25 from BASF Aktiengesellschaft.

Examples of nonionic aromatic or aromatic-aliphatic alkoxylated emulsifiers are ethoxylated and ethoxylated/propoxylated, preferably ethoxylated, $C_6$–$C_{32}$-alkylphenols, in particular $C_6$–$C_{16}$-alkylphenols, having an average degree of ethoxylation of from 2 to 150, preferably from 3 to 100, and in particular from 3 to 50.

The anionic groups of anionic alkoxylated emulsifiers are usually selected from sulfate groups, sulfonate groups, carboxylate groups, phosphonate groups and phosphate groups. Suitable as opposite ions of the ionic groups are cations such as sodium, potassium, calcium or ammonium ions as well as mixtures thereof. Preferably, the opposite ion differs from ammonium ions of readily volatile amines, such as ammonia, methylamine or ethylamine. A preferred opposite ion is the sodium ion. Preferred anionic groups are the sulfate group and the sulfonate group.

Examples of anionic alkoxylated emulsifiers are the sulfuric monoesters and phosphoric monoesters of the above-mentioned nonionic alkoxylated emulsifiers, and $C_8$–$C_{32}$-alkenylpolyethoxysulfonates and $C_8$–$C_{32}$-alkenylpolyethoxysulfates, $C_8$–$C_{32}$-alkylglycerylpolyethoxysulfonates, ethoxylated sulfosuccinic monoesters and diesters, $C_8$–$C_{32}$-alkenyl- or dialkylpolyethoxyphosphates, ethoxylated mono- and dialkyldiphenyl ethers, mono- and polysulfonated on the nucleus, ethoxylated α-sulfo fatty acid esters, ethoxylated fatty acid alkanolamine sulfates, sulfonated or sulfated ethoxylated fatty acid esters, fatty acid sarcosides, fatty acid glycolates, fatty acid lactates, fatty acid taurides and fatty acid isothionates, which have a degree of ethoxylation of from 2 to 150, preferably from 2 to 100, particularly preferably from three to 50, and their salts, particularly the alkali metal salts, e.g. the sodium or potassium salts, or the ammonium salts, e.g. the salts with organic amines, such as mono-, di- or tri-$C_1$–$C_4$-alkylamines or mono-, di- or triethanolamines.

Preferred anionic aliphatic alkoxylated emulsifiers are selected from the sulfuric monoesters of ethoxylated $C_8$–$C_{20}$-fatty alcohols, in particular $C_9$–$C_{16}$-fatty alcohols, for example fatty alcohols which are predominantly not highly branched and which are obtainable by reduction of naturally occurring fatty acids, and ethoxylated $C_8$–$C_{32}$-oxo alcohols, in particular $C_9$–$C_{16}$-oxo alcohols, which in general are more highly branched compared with the fatty alcohols and which have an average degree of ethoxylation from 2 to 50, in particular from 2 to 30, for example from 2 to 15 or from 9 to 30.

Preferred anionic aromatic or anionic aromatic-aliphatic alkoxylated emulsifiers are selected from the sulfuric monoesters of ethoxylated and ethoxylated/propoxylated, preferably ethoxylated $C_6$–$C_{32}$-alkylphenols, in particular $C_6$–$C_{16}$-alkylphenols, particularly preferably octylphenol and nonylphenol, which have an average degree of alkoxylation of from 2 to 50, in particular from 2 to 35.

If required the novel formulations may also contain nonalkoxylated emulsifiers, but as a rule at least 50, preferably at least 75, % by weight of the emulsifiers used are alkoxylated emulsifiers. In one embodiment, the novel formulations are essentially free of nonalkoxylated emulsifiers. Other preferred embodiments relate to those formulations which contain at least one nonionic alkoxylated emulsifier and at least one anionic emulsifier selected from alkoxylated and anionic nonalkoxylated emulsifiers.

Preferably, the polymer dispersions to be used according to the invention or the polymer powders or polymer granules obtainable from them by drying, i.e. by removing at least 80, preferably at least 85, or at least 90, % by weight of the volatile components, contains from 0.2 to 10, preferably from 0.5 to 5, % by weight, based on the amount of polymer of at least one emulsifier.

In a preferred embodiment of the present invention, at least one nonionic alkoxylated emulsifier, preferably one nonionic aliphatic alkoxylated emulsifier, is used as the alkoxylated emulsifier.

Preferably, the polymers to be used according to the invention contain
a mixture of at least one nonionic alkoxylated emulsifier and at least one anionic alkoxylated emulsifier or
a mixture of at least one nonionic alkoxylated emulsifier, at least one anionic alkoxylated emulsifier and at least one anionic nonalkoxylated emulsifier or
a mixture of at least one anionic, nonalkoxylated emulsifier and at least one nonionic alkoxylated emulsifier.

Polymer dispersions which contain such a mixture of emulsifiers have even greater stability, in particular to shear loads.

If the copolymers to be used according to the invention contain a mixture of at least one anionic emulsifier and at least one nonionic alkoxylated emulsifier, as a rule from 15 to 90, preferably from 25 to 80, particularly preferably from 40 to 70, % by weight of the total amount of emulsifiers present are accounted for by anionic emulsifiers.

Emulsifier mixtures particularly preferred according to the invention contain at least one nonionic aliphatic alkoxylated emulsifier, preferably one ethoxylated $C_8$–$C_{20}$-fatty alcohol, in particular $C_9$–$C_{16}$-fatty alcohol, and/or one ethoxylated $C_8$–$C_{32}$-oxo alcohol, in particular $C_9$–$C_{16}$-oxo alcohol, which has an average degree of ethoxylation of from 5 to 50, in particular from 6 to 30, and at least one anionic aliphatic alkoxylated emulsifier, preferably one sulfuric monoester of an ethoxylated $C_8$–$C_{20}$-fatty alcohol, in particular $C_9$–$C_{16}$-fatty alcohol, and/or one sulfuric monoester of an ethoxylated $C_8$–$C_{32}$-oxo alcohol, in particular $C_9$–$C_{16}$-oxo alcohol, which has an average degree of ethoxylation of from 2 to 50, in particular from 3 to 35.

The abovementioned surfactants, in particular the emulsifiers, can be used wholly or partly in the preparation of the copolymers, can be added wholly or partly after the preparation of the copolymers or can be added wholly or partly during the use for the production of the novel building materials. In the preparation of the copolymers to be used according to the invention by free radical emulsion polymerization in aqueous media, it has proven advantageous to use at least 25, preferably at least 35, particularly preferably at least 50, % by weight of the total amount of the emulsifiers in the preparation of the copolymers.

In some embodiments, the total amount of emulsifier is used essentially in the preparation of the copolymers. In other preferred embodiments, from 30 to 65, preferably from 35 to 60, particularly preferably from 40 to 55, % by weight of the total amount of the emulsifiers used, in particular the ionic emulsifiers, are added in the course of the free radical emulsion polymerization. The remaining amount of emulsifier is added after the end of the polymerization (subsequent hydrolysis). The same emulsifiers or different emulsifiers can be used for the preparation and the subsequent hydrolysis; when a plurality of emulsifiers are used, the mixing ratio of the emulsifiers for the preparation of the copolymers and for the subsequent hydrolysis may be different. In particular, anionic alkoxylated emulsifiers and/or anionic nonalkoxylated emulsifiers can be added during the subsequent hydrolysis.

In order to achieve a sufficient improvement in the mechanical strength of the building materials based on hydraulic binders, it is as a rule advisable to use copolymers having glass transition temperatures above −60° C., preferably above −50° C. The copolymers therefore preferably have a glass transition temperature $T_g$ of >−45° C., particularly preferably >−40° C., in particular >−35° C.

In order to achieve a sufficient improvement in the flexibility, in particular the low-temperature flexibility, of the building materials, the copolymers should be capable of film formation in the building materials based on hydraulic binders. The copolymers to be used according to the invention therefore generally have a glass transition temperature $T_g$ of <+40° C., preferably <+30° C., particularly preferably <+20° C., very particularly preferably <+10° C., in particular <0° C.

Suitable copolymers for the novel use therefore have glass transition temperatures $T_g$ of about −30° C., about −25° C., about −20° C., about −15° C., about −10° C. or about −5° C.

Here, the glass transition temperature $T_g$ is understood as meaning the midpoint temperature determined according to the ASTM D 3418-82 by differential thermal analysis (DTA) (cf. Ullmann's Encyclopedia of Industrial Chemistry, 5th Edition, Volume A 21, VCH Weinheim 1992, page 169, and Zosel, Farbe und Lack 82 (1976), 125–134, cf. also DIN 53765).

In the case of polymer dispersions which contain copolymer components having different glass transition temperatures, it is generally advantageous if at least the principal component has a glass transition temperature $T_g$ according to one of the abovementioned ranges. Such formulations are obtainable, for example, by mixing two or more different copolymers or by polymerization processes which lead to, for example, step polymers, polymer particles having a core/shell morphology or other copolymer particles having a nonrandom composition.

The glass transition temperature $T_g$ can be brought to a desired value both by the choice of the corresponding monomers and by the choice of the ratios of the monomers used in the copolymer or the copolymers.

In this context, it proves helpful to estimate the glass transition temperature $T_g$ of the copolymer P. According to Fox (T. G. Fox, Bull. Am. Phys. Soc. (Ser. II) 1 (1956), 123, and Ullmanns Enzyklopädie der technischen Chemie, Weinheim (1980), pages 17–18), a good approximation for the glass transition temperature of slightly crosslinked copolymers at high molar masses is $$\frac{1}{T_g} = \frac{X^1}{T_g^1} + \frac{X^2}{T_g^2} + \cdots \frac{X^n}{T_g^n}$$

where $X^1$, $X^2$, ..., $X^n$ are the mass fractions of the monomers 1, 2, ..., n and $T_g^1$, $T_g^2$, ..., $T_g^n$ are the glass transition temperatures of the polymers composed in each case only of one of the monomers 1, 2, ..., n, in degrees Kelvin. The latter are known, for example, from Ullmann's Encyclopedia of Industrial Chemistry, VCH, Weinheim, Vol. A 21 (1992) page 169 or from J. Brandrup, E. H. Immergut, Polymer Handbook 3rd Ed, J. Wiley, New York, 1989.

Methods for establishing the polymer particle size as described above are disclosed, for example, in EP-A-126 699, EP-A-567 881, EP-A-567 819, DE-A-31 47 008 and der DE-A-42 13 967.

Preferably, the polymer dispersions used according to the invention have a pH of from 6.7 to 8.0, preferably 6.8 to 7.5, particularly preferably from 6.9 to 7.2, for example 7.0 or 7.1 Nonvolatile bases are preferably used for establishing the pH of the polymer dispersions. Suitable nonvolatile bases are, for example, sodium hydroxide solution, potassium hydroxide solution and slaked lime, which can be used, for example, in the form of a solid or the form of an aqueous solution (calcium hydroxide solution). Slaked lime in the form of an aqueous suspension is preferably used. Establishing the specific pH range as described above and using the abovementioned bases have an advantageous effect on the application profile of the dispersions to be used according to the invention. In particular, the compatibility of the polymer dispersions with the hydraulic binders is favorably affected.

The polymer dispersions to be used according to the invention can be added directly to the building materials based on hydraulic binders, if necessary after establishing the solids content and/or after adding conventional assistants (as described above). If aqueous dispersions are used according to the invention, the solids content of the dispersion, i.e. the content of nonvolatile components, is as a rule from 20 to 80% by weight. Preferably, the dispersions are used as from 30 to 70, particularly from 35 to 60, particularly preferably from 40 to 55, % strength by weight aqueous dispersions, based on the solids content.

The viscosity of the aqueous dispersions is as a rule from 10 to 2 500, preferably from 20 to 500, mPa.s, measured as 55% strength by weight dispersion in a rotational viscometer according to DIN 53019 at 23° C. and a shear rate of 250 s$^{-1}$. The aqueous polymer dispersions may contain organic solvents, preferably water-miscible organic solvents, e.g. alcohols, diols and polyols. Preferably, the content of organic solvents is less than 10% by weight, based on the total weight of the polymer dispersion, and particularly preferably the polymer dispersions are essentially free of organic solvents.

The polymer dispersions to be used according to the invention can also be used in semisolid form, for example as a pasty material, or in solid form, for example as powder or granules. Polymer powders or granules are obtainable from the polymer dispersions by drying, preferably by spray-drying.

The present invention therefore also relates to the use of polymer powders or granules, which are obtainable, for example, by removing at least 80%, preferably at least 90, % by weight of the volatile components from aqueous polymer dispersions as described above, as additives for building materials based on hydraulic binders.

The polymer dispersions, polymer powders or polymer granules may contain conventional assistants. The assistants are used, as a rule, in total amounts of from 0.1 to 30% by weight, based on the copolymer. Conventional assistants are, for example, wetting agents, fungicides, biocides, antifoams, for example the commercially available antifoams from BASF (Ludwigshafen), from Munzig (Heilbronn) and from Wacker (Munich), thickeners, anti-freezes, leveling agents, plasticizers and film formation assistants. Suitable film formation assistants are, for example, ethylene glycol, propylene glycol, butylene glycol, hexylene glycol, diethylene glycol, dipropylene glycol, dibutylene glycol, their monoethers with $C_1$–$C_4$-alkanols, e.g. diethylene glycol monoethyl ether, diethylene glycol monobutyl ether, propylene glycol monophenyl ether, propylene glycol monopropyl ether, propylene glycol monobutyl ether, dipropylene glycol monopropyl ether or dipropylene glycol monobutyl ether, their ether acetates, such as diethylene glycol monoethyl ether acetate, diethylene glycol monobutyl ether acetate, propylene glycol monopropyl ether acetate, propylene glycol monobutyl ether acetate or dipropylene glycol n-butyl ether acetate, and furthermore alkyl esters of aliphatic mono- and dicarboxylic acids, e.g. Texanol® from Eastman Kodak or industrial mixtures thereof, e.g. Lusolvan FBH from BASF AG (mixtures of di-n-butyl esters of succinic, glutaric and adipic acid). Suitable plasticizers are all conventional plasticizers suitable for dispersions, for example (oligo) propylene glycol alkylphenyl ethers, as commercially available, for example in the form of Plastilit® 3060 from BASF AG.

The polymer dispersions, polymer powders or polymer granules to be used according to the invention may additionally contain a plasticizer for hydraulic binders. As a rule, plasticizers for hydraulic binders are additives which result in a change in the properties of building materials based on hydraulic binders, in particular the processing consistency and/or setting properties. In general, such plasticizers for building materials based on hydraulic binders are water-soluble macromolecular substances.

The good processability of the building materials which are modified with the dispersions to be used according to the invention and are based on hydraulic binders can be even further improved in many cases by the presence of a plasticizer.

Preferred plasticizers are those based on naphthalenesulfonic acid/formaldehyde condensates, melamine/formaldehyde polycondensates and/or ligninsulfonates, as described, for example, in EP-A-402 319, and those based on homo- and copolymers of carboxylic acids and dicarboxylic acids with styrene, as in, for example, EP-A-306 449 and U.S. Pat. No. 3,952,805, or isobutene or diisobutene, as described in DE-A-37 16 974, EP-A-338 293, DE-A-39 25 306, U.S. Pat. No. 4,586,960, U.S. Pat. No. 4,042,407 and U.S. Pat. No. 4,906,298.

Also suitable are plasticizers based on copolymers of unsaturated carboxylic acids and hydroxyalkyl esters of unsaturated carboxylic acids, as described, for example, in EP 97 613, those based on polymerized carboxylic acid monomers and polyalkylene oxide esters of acrylic acid and of methacrylic acid, as described, for example, in DE-A-44 20 444, those based on ethylenically unsaturated polyoxyalkylene ethers, polyunsaturated alkenyl ethers and maleic anhydride, as described, for example, in EP 619 277, or those based on copolymers of maleic acid derivatives and vinyl monomers, as described in DE-A-43 04 109 and EP-A-610 699.

The abovementioned publications are hereby incorporated in their entirety by reference.

Such plasticizers are commercially available, for example, from ADDIMENT (Heidelberg), SKW (Trostberg), BASF (Ludwigshafen), in particular the Sokalan grades, and DYCKERHOFF (Wiesbaden).

Plasticizers based on naphthalenesulfonic acid condensates, copolymers of carboxylic acid monomers and polyalkylene oxide esters of acrylic acid and of methacrylic acid are preferably used.

The polymer dispersions or polymer powders or polymer granules to be used according to the invention are added to the building materials based on hydraulic binders preferably in an amount of from 5 to 250, particularly preferably from 10 to 150, in particular from 20 to 100, % by weight, based on the dry weight of the hydraulic binder. As a rule, the addition of from 10 to 50 or from 15 to 40% by weight, based on the hydraulic binder, of polymer is sufficient for achieving the desired improvement in the properties of hydraulic binders and building materials based on hydraulic binders. The addition of polymer dispersion, polymer powder or polymer granules is calculated as an amount of added copolymer.

The polymer dispersions, polymer powders or polymer granules to be used according to the invention are added to the building materials based on hydraulic binders as a rule in an amount of from 2 to 150, preferably from 5 to 80, particularly preferably from 10 to 50, % by weight of copolymer, based on the dry weight of the mineral fraction of the building materials. As a rule, the addition of from 5 to 35 or from 10 to 25% by weight, based on the dry weight of the mineral fraction of the building materials based on hydraulic binders, of polymer is sufficient for achieving the desired improvement in the properties of the building materials.

Conventional assistants for building materials based on hydraulic binders are in particular the assistants and plasticizers described above. Suitable further assistants for use in building materials are known to the person skilled in the art and are described, for example, in H. Reul, Handbuch der Bauchemie, Verlag für chemische Industrie H. Ziolkowsky KG, Augsburg (1991).

Suitable conventional additives for building materials based on hydraulic binders are, for example, mineral additives, such as gravel, coarse sand, fine sand, quartz sand of different particle sizes, for example particle sizes of from 0.08 to 0.8 mm, quartz powder, for example having particle sizes ≦0.09 mm, basalt, limestone, chalk, marble, trass, silicate dust, precipitated silica, hard coal fly ash and barium sulfate. Further suitable mineral or nonmineral additives are known to a person skilled in the art and are described, for example, in Sachstandsbericht Dt. Bauchemie: Modifizierte Mineralische Mörtelsysteme und Umwelt (1st Edition, July 1998). Nonmineral additives are, for example, organic fibers and organic porous substances.

The present invention also relates to building materials based on hydraulic binders, which contain from 2 to 150, preferably from 5 to 80, particularly preferably from 5 to 30, % by weight, based on the dry weight of the mineral fraction and calculated as copolymer, of a polymer dispersion as described above or of a polymer powder or polymer granules obtained therefrom.

Typical building materials which are based on hydraulic binders, whose properties may be improved by the use according to the invention, are cement, liquid cement, concrete, mortar, render, floor topping materials, binder formulations, in particular those based on cement, road surfacings and tile adhesives. Preferred building materials are in particular mineral sealing slurries.

Depending on the intended use and processing stage, the building materials may be present in solid form (for example prior to the addition of the mixing water or the polymer dispersion or after hardening), in liquid form and in viscous or pasty form.

Of course, the polymer powders obtained from the polymer dispersions can also be mixed with the mineral binder before being used in the building material. Such formulations contain the hydraulic binder, preferably cement, and the polymer as a rule as principal components. Furthermore, these formulations may contain conventional mineral or nonmineral additives and conventional assistants, for example as described above.

The present invention also relates to a process for improving the mechanical strength, elasticity and processibility of building materials based on hydraulic binders, in which hydraulic binder and polymer dispersion, polymer powder or polymer granules and, if required, water and/or additives are mixed with one another. Suitable mixing methods and mixing apparatuses are known to a person skilled in the art and are described, for example, in Ullmanns Enzyklopädie der technischen Chemie, 3rd Edition, 1951, Volume 1, pages 693 to 727.

The novel use of the polymer dispersions, polymer powders or polymer granules leads to polymer-modified building materials which, in comparison with the polymer-modified building materials based on hydraulic binders of the prior art, produce only very little or no unpleasant odor during mixing of polymer and hydraulic binder and also thereafter. In a large number of building materials based on mineral binders, the novel use of the polymer dispersions, polymer powders or polymer granules moreover leads to improved properties in the solidified or set state, in particular to higher mechanical strength, for example higher flexibility, higher tensile strength and/or greater cohesion. The water resistance of the building materials in a solidified or set state is improved and their water absorption is substantially reduced. As a rule the processibility of the building materials based on hydraulic binders prior to solidification is also improved, for example through an advantageous open time and through little adhesion to the tools during stirring or suspending of the hydraulic binders to give liquid, semisolid or pasty building materials. The properties of the novel dispersions, polymer powders or polymer granules are particularly advantageous in the case of building materials based on cement.

The novel polymer dispersions are of course also suitable for applications in the absence of cement, in particular for filler-containing coating systems, especially for flexible coating systems, such as flexible roof coating materials and sealing compounds and adhesive, especially filler-containing construction adhesives, such as tile adhesives.

In addition to water, typical formulations for flexible roof coating materials also include novel polymer dispersions, pigments, such as titanium dioxide or barium sulfate, and fillers, such as calcium carbonate, chalk, talc or clays, and conventional assistants, for example biocides, wetting agents, film formation assistants, e.g. hydrocarbons such as gasoline, plasticizers, solvents and antifreezes, e.g. glycerol or glycol, thickeners (e.g. associative thickeners) and antifoams. The amount of pigments is as a rule from 1 to 5 parts by weight per part by weight of copolymer. The amount of assistants is as a rule from 0.5 to 25 parts by weight per 100 parts by weight of copolymer.

A typical composition for flexible roof coating materials appears in Example 2 of EP-A 501 272, which is hereby incorporated by reference, the polymer dispersion stated there being replaced by a novel polymer dispersion. Further formulations of flexible roof coating materials are described by L. Chandler in Paint & Resin 9/10 (1981), 24–25, it being possible for the polymer dispersions used there likewise to be replaced by dispersions of the novel copolymers.

In addition to the novel copolymers and water, typical formulations for tile adhesive also include fillers, for example the abovementioned fillers and/or silicates, or silicas; furthermore assistants, for example the abovementioned assistants. The amount of fillers is as a rule from 5 to 10 parts by weight per part by weight of copolymer. The amount of assistants is as a rule from 1 to 20 parts by weight per 100 parts by weight of copolymer. Typical formulations for tile adhesive are stated in EP-A 35 332, Examples 2 and 4, which is hereby incorporated by reference. The polymer dispersions used there can be replaced by the novel copolymer dispersions.

The examples which follow illustrate the invention without restricting it.

EXAMPLES

The novel polymer dispersions used in the examples according to the invention and the polymer dispersions of the comparative examples were obtained by free radical polymerization in an aqueous medium.

A list of the monomers incorporated as polymerized units in the copolymers of the polymer dispersions, in % by weight, appears in Table 1. The solids content of the polymer dispersion (i.e. the nonvolatile fractions) was determined from the weight loss of a sample (about 1 g) as a result of drying for 2 hours in a through-circulation drying oven at 120° C. The viscosity of the polymer dispersions was determined with the aid of a rotational viscometer (Rheomat) from Paar Physica at a shear rate of $250^{-1}$ according to DIN 53019 at 23° C. The glass transition temperatures $T_g$ were determined with the aid of a $DSC_{820}$ differential calorimeter from Mettler Toledo at a linear heating rate of 5° C./min.

I. Preparation of the Novel Polymer Dispersions

Dispersion ED1

200 g of demineralized water were initially taken in a 2 l glass vessel with an anchor stirrer (120 rpm). At an internal temperature of 85° C., 5% by weight of a total amount of feed 1 and 10% by weight of the total amount of a feed 2 were added. The initially taken mixture was prepolymerized for 10 minutes at 85° C. Thereafter, the remaining amount of feed 1 and feed 2 was fed in spatially separately and continuously at 85° C. in the course of 3.5 hours. After a further 30 minutes at this temperature, cooling was carried out and the reaction mixture was neutralized with a 20% strength by weight aqueous calcium hydroxide solution. Feed 3 was added while stirring. The formulation thus prepared contained 49.8% by weight of nonvolatile components and had a pH of 7.2. The viscosity was 67 mPa.s. The copolymer contained in the dispersion had a glass transition temperature $T_g$ of −14° C.

| Feed 1: | |
|---|---|
| 185 g | of demineralized water |
| 17 g | of a 30% strength by weight aqueous solution of the sodium salt of the sulfuric monoester with ethoxylated lauryl alcohol, having a degree of ethoxylation of about 30 (Disponil FES 77 from Henkel); below: emulsifier solution I |
| 13 g | of a 20% strength by weight aqueous solution of an ethoxylated $C_{16}/C_{18}$-alcohol having a degree of ethoxylation of about 18; below: emulsifier solution II |
| 110 g | of styrene |
| 385 g | of n-butyl acrylate |
| 17 g | of acrylonitrile |
| 33 g | of 2-hydroxyethyl acrylate |
| 6 g | of methacrylic acid |
| Feed 2: | |
| 60 g | of demineralized water |
| 2 g | of sodium peroxodisulfate |
| Feed 3: | |
| 8 g | of emulsifier solution I |
| 25 g | of emulsifier solution II |

Dispersion ED2

320 g of demineralized water were initially taken in a 2 l glass vessel with an anchor stirrer (120 rpm). At an internal temperature of 85° C., 5% by weight of the total amount of a feed 1 and 10% by weight of the total amount of a feed 2 were added. The initially taken mixture was prepolymerized for 10 minutes at 85° C. Thereafter, the remaining amount of feed 1 and feed 2 was fed in spatially separately and continuously at 85° C. in the course of 3.5 hours. After a further 30 minutes at this temperature, cooling was carried out and the reaction mixture was neutralized with a 20% strength by weight aqueous calcium hydroxide solution. Feed 3 was added while stirring. The formulation thus prepared contained 49.2% by weight of nonvolatile components and had a pH of 7.0. The viscosity was 46 mPa.s. The copolymer contained in the dispersion had a glass transition temperature $T_g$ of −20° C.

| Feed 1: | |
|---|---|
| 371 g | of demineralized water |
| 30 g | of emulsifier solution I |
| 23 g | of emulsifier solution II |
| 180 g | of styrene |
| 725 g | of n-butyl acrylate |
| 90 g | of 2-hydroxyethyl acrylate |
| 5 g | of methacrylic acid |
| Feed 2: | |
| 120 g | of demineralized water |
| 4 g | of sodium peroxodisulfate |
| Feed 3: | |
| 14 g | of emulsifier solution I |
| 45 g | of emulsifier solution II |

Dispersion ED3

450 g of demineralized water were initially taken in a 4 l glass vessel having an anchor stirrer (120 rpm). At an internal temperature of 85° C., 5% by weight of the total amount of a feed 1 and 10% by weight of the total amount of a feed 2 were added. The initially taken mixture was prepolymerized for 10 minutes at 90° C. Thereafter, at 90° C., the remaining amount of feed 1 was fed in in the course of 3 hours while the remaining amount of feed 2 was fed in spatially separately in the course of 3.5 hours. After a further 30 minutes at this temperature, the reaction mixture was cooled and was neutralized with a 20% strength by weight aqueous calcium hydroxide solution. The polymer dispersion thus prepared contained 54.9% of nonvolatile components and had a pH of 7.0. The viscosity was 148 mPa.s. The copolymer contained had a glass transition temperature of −8° C.

| Feed 1: | |
|---|---|
| 539 g | of demineralized water |
| 28 g | of a 25% strength by weight aqueous solution of the sodium salt of the sulfuric monoester of ethoxylated nonylphenol having a degree of ethoxylation of about 25; below: emulsifier solution III |
| 20 g | of a 20% strength by weight aqueous solution of the sodium salt of the sulfuric monoester of ethoxylated octylphenol having a degree of ethoxylation of about 25; below: emulsifier solution IV |
| 960 g | of n-butyl acrylate |
| 390 g | of methyl methacrylate |
| 135 g | of 2-hydroxyethyl acrylate |
| 15 g | of acrylic acid |
| Feed 2: | |
| 95 g | of demineralized water |
| 7 g | of sodium peroxodisulfate |

Dispersion ED4

450 g of demineralized water were initially taken in a 4 l glass vessel having an anchor stirrer (120 rpm). At an internal temperature of 85° C., 5% by weight of the total amount of a feed 1 and 10% by weight of the total amount of a feed 2 were added. The initially taken mixture was prepolymerized for 10 minutes at 85° C. Thereafter, the remaining amount of feed 1 and feed 2 was fed in spatially separately at 85° C. in the course of 3.5 hours. After a further 30 minutes at this temperature, the reaction mixture was cooled and was neutralized with a 20% strength by weight aqueous calcium hydroxide solution. Feed 3 was then added while stirring. The polymer dispersion thus prepared contained 50.4% of nonvolatile components and had a pH of 7.0. The viscosity was 45 mPa.s. The copolymer contained had a glass transition temperature of −31° C.

| Feed 1: | |
|---|---|
| 413 g | of demineralized water |
| 35 g | of emulsifier solution I |
| 26 g | of emulsifier solution II |
| 420 g | of 2-ethylhexyl acrylate |
| 420 g | of n-butyl acrylate |
| 210 g | of styrene |
| 63 g | of 2-hydroxyethyl acrylate |
| Feed 2: | |
| 90 g | of demineralized water |
| 4 g | of sodium peroxodisulfate |
| Feed 3: | |
| 18 g | of emulsifier solution I |
| 53 g | of emulsifier solution II |

Dispersion ED5

450 g of demineralized water were initially taken in a 4 l glass vessel having an anchor stirrer (120 rpm). At an internal temperature of 85° C., 5% by weight of the total amount of a feed 1 and 10% by weight of the total amount of a feed 2 were added. The initially taken mixture was prepolymerized for 10 minutes at 85° C. Thereafter, the remaining amount of feed 1 and feed 2 was fed in spatially separately at 85° C. in the course of 3.5 hours. After a further 30 minutes at this temperature, the reaction mixture was cooled and was neutralized with a 20% strength by weight aqueous calcium hydroxide solution. Feed 3 was then added while stirring. The polymer dispersion thus prepared contained 50.3% of nonvolatile components and had a pH of 6.9. The viscosity was 44 mPa.s. The copolymer contained had a glass transition temperature of −26° C.

| Feed 1: | |
|---|---|
| 413 g | of demineralized water |
| 35 g | of emulsifier solution I |
| 26 g | of emulsifier solution II |
| 368 g | of 2-ethylhexyl acrylate |
| 420 g | of n-butyl acrylate |
| 263 g | of styrene |
| 63 g | of 2-hydroxyethyl acrylate |
| Feed 2: | |
| 90 g | of demineralized water |
| 4 g | of sodium peroxodisulfate |
| Feed 3: | |
| 18 g | of emulsifier solution I |
| 53 g | of emulsifier solution II |

Dispersion ED6

250 g of demineralized water were initially taken in a 2 l glass vessel having an anchor stirrer (120 rpm). At an internal temperature of 85° C., 5% by weight of the total amount of feed 1 and 10% by weight of the total amount of feed 2 were added. The initially taken mixture was prepolymerized for 10 minutes at 85° C. Thereafter, the remaining amount of a feed 1 and a feed 2 was fed in spatially separately at 85° C. in the course of 3.5 hours. After a further 30 minutes at this temperature, the reaction mixture was cooled and was neutralized with a 20% strength by weight aqueous calcium hydroxide solution. Feed 3 was then added while stirring. The polymer dispersion thus prepared contained 50.3% of nonvolatile components and had a pH of 7.0. The viscosity was 47 mPa.s. The copolymer contained had a glass transition temperature of −25° C.

| Feed 1: | |
|---|---|
| 250 g | of demineralized water |
| 18 g | of emulsifier solution I |
| 14 g | of emulsifier solution IV |
| 220 g | of 2-ethylhexyl acrylate |
| 193 g | of n-butyl acrylate |
| 138 g | of styrene |
| 22 g | of 2-hydroxyethyl acrylate |
| Feed 2: | |
| 50 g | of demineralized water |
| 2 g | of sodium peroxodisulfate |
| Feed 3: | |
| 9 g | of emulsifier solution I |
| 28 g | of emulsifier solution II |

II. Preparation of the Comparative Dispersions

Comparative Dispersion VD1

280 g of demineralized water were initially taken in a 2 l glass vessel having an anchor stirrer (120 rpm). At an internal temperature of 85° C., 5% by weight of the total amount of feed 1 and 10% by weight of the total amount of feed 2 were added. The initially taken mixture was prepolymerized for 10 minutes at 85° C. Thereafter, the remaining amount of a feed 1 and a feed 2 was fed in spatially separately at 85° C. in the course of 3.5 hours. After a further 30 minutes at this temperature, the reaction mixture was cooled and was neutralized with a 20% strength by weight aqueous calcium hydroxide solution. Feed 3 was then added while stirring. The polymer dispersion thus prepared contained 50.3% of nonvolatile components and had a pH of 7.2. The viscosity was 48 mPa.s. The copolymer contained had a glass transition temperature of −24° C.

| The following was used as feed 1: | |
|---|---|
| 116 g | of demineralized water |
| 15 g | of emulsifier solution I |
| 23 g | of emulsifier solution II |
| 288 g | of 2-ethylhexyl acrylate |
| 72 g | of styrene |
| 74 g | of acrylonitrile |
| 38 g | of 2-hydroxyethyl acrylate |
| 7 g | methacrylic acid |
| The following was used as feed 2: | |
| 100 g | of demineralized water |
| 3 g | of sodium peroxodisulfate |
| The following was used as feed 3: | |
| 8 g | of emulsifier solution I |
| 15 g | of emulsifier solution II |

Comparative Dispersion VD2

170 g of demineralized water were initially taken in a 2 l glass vessel having an anchor stirrer (120 rpm). At an internal temperature of 85° C., 5% by weight of the total amount of feed 1 and 10% by weight of the total amount of feed 2 were added. The initially taken mixture was prepolymerized for 10 minutes at 85° C. Thereafter, the remaining amount of a feed 1 and a feed 2 was fed in spatially separately at 85° C. in the course of 3.5 hours. After a further 30 minutes at this temperature, the reaction mixture was cooled and was neutralized with a 20% strength by weight aqueous calcium hydroxide solution. Feed 3 was then added while stirring. The polymer dispersion thus prepared contained 48.9% of nonvolatile components and had a pH of 7.0. The viscosity was 388 mPa.s. The copolymer contained had a glass transition temperature of −21° C.

| The following was used as feed 1: | |
|---|---|
| 197 g | of demineralized water |
| 15 g | of emulsifier solution I |
| 11 g | of emulsifier solution II |
| 391 g | of 2-ethylhexyl acrylate |
| 176 g | of styrene |
| 16 g | of acrylonitrile |
| 38 g | of acrylamide |
| 9 g | of methacrylic acid |
| The following was used as feed 2: | |
| 60 g | of demineralized water |
| 2 g | of sodium peroxodisulfate |
| The following was used as feed 3: | |
| 8 g | of emulsifier solution I |
| 23 g | of emulsifier solution II |

Comparative Dispersion VD3

500 g of demineralized water were initially taken in a 4 l glass vessel having an anchor stirrer (120 rpm). At an internal temperature of 85° C., 5% by weight of the total amount of a feed 1 and 10% by weight of the total amount of a feed 2 were added. The initially taken mixture was prepolymerized for 10 minutes at 85° C. Thereafter, the remaining amount of feed 1 and feed 2 was fed in spatially separately at 85° C. in the course of 3.5 hours. After a further 30 minutes at this temperature, the reaction mixture was cooled and was neutralized with a 20% strength by weight aqueous calcium hydroxide solution. Feed 3 was then added while stirring. The polymer dispersion thus prepared contained 49.4% of nonvolatile components and had a pH of 7.2. The viscosity was 298 mPa.s. The copolymer contained had a glass transition temperature of −20° C.

| The following was used as feed 1: | |
|---|---|
| 561 g | of demineralized water |
| 43 g | of emulsifier solution I |
| 33 g | of emulsifier solution II |
| 853 g | of 2-ethylhexyl acrylate |
| 382 g | of styrene |
| 29 g | of acrylonitrile |
| 118 g | of 2-hydroxyethyl acrylate |
| 88 g | of methacrylic acid |
| The following was used as feed 2: | |
| 120 g | of demineralized water |
| 5 g | of sodium peroxodisulfate |
| The following was used as feed 3: | |
| 22 g | of emulsifier solution I |
| 65 g | of emulsifier solution II |

Comparative Dispersion VD4

The preparation of this dispersion was carried out analogously to the preparation of the dispersion VD3.

| The following was used as feed 1: | |
|---|---|
| 399 g | of demineralized water |
| 140 g | of a 15% strength by weight aqueous solution of a sodium dodecylsulfate (emulsifier solution V) |
| 928 g | of 2-ethylhexyl acrylate |
| 433 g | of styrene |
| 39 g | of acrylonitrile |
| 124 g | of 2-hydroxyethyl acrylate |
| 23 g | of methacrylic acid |
| The following was used as feed 2: | |
| 120 g | of demineralized water |
| 5 g | of sodium peroxodisulfate |
| The following was used as feed 3: | |
| 140 g | of emulsifier solution V |

The polymer dispersion thus prepared contained 50.0% of nonvolatile components and had a pH of 6.9. The viscosity was 76 mPa.s. The copolymer contained had a glass transition temperature of −21° C.

III. Testing of the Stability

The coagulum formation, the shear stability and the electrolyte stability were determined as described below, as criteria for the stability of the dispersions.

The tendency to form coagulum during the emulsion polymerization was determined by filtering the cooled and neutralized polymer dispersion through a Perlon sieve having a mesh size of 45 μm. The stated coagulum values are the ratio of the filtration residue after superficial drying to the total mass of the polymer dispersion.

In order to test the shear stability, an undiluted sample of each dispersion was subjected to a shear load with the aid of a Dispermat (VMA Getzmann GmbH) for 10 minutes at 10 000 rpm. A small amount of the sample was then spread on a glass support. For comparison, a small amount of the dispersion not subjected to a shear load was likewise spread on a glass support and subjected to a comparative investigation to determine the content of coagulum or fine coagulum (i.e. gel). If there is a substantial increase in the coagulum content or gel content in comparison with the sample not subjected to a shear load, the sample is considered to be unstable to shearing.

In order to test the electrolyte stability, a sample of the respective dispersion was added dropwise to a stirred aqueous calcium chloride solution of defined concentration, thermostatted at 23° C. (in each case 50 g of calcium chloride solution having calcium chloride contents of from 0.5 to 7.5% by weight). Table 1 shows, for each dispersion, the calcium chloride concentration of the solution at which the sample of the respective dispersion was still stable.

The results are summarized in Table 2.

IV. Testing of the Performance Characteristics

The water absorption of films of the respective polymer dispersions was investigated as a measure for the hydrophilic character of the polymer dispersion. Polymer films of each polymer dispersion, having a layer thickness of about 750 μm when dry, were produced by drying for 7 days at 50° C. in a through-circulation drying oven. In each case 2 cm long and 1 cm wide pieces were cut out of the films and were stored in water for 24 hours at room temperature. The pieces were then superficially dried and were weighed. The water absorption was calculated from the quotient of film weights before and after the storage in water.

In order to determine the performance characteristics as an additive to building materials based on hydraulic binders, cement-containing materials modified with the polymer dispersions were prepared. For this purpose, 182 parts by weight of Portland cement PZ 45F (CEM I 42.5 R), 218 parts by weight of the respective polymer dispersion (brought to a solids content of 50%), 53 parts by weight of water, 149 parts by weight of quartz powder (particle size ≦0.09 mm), 164 parts by weight of quartz sand (particle size from 0.08 to 0.2 mm), 218 parts by weight of quartz sand (particle size from 0.2 to 0.5 mm), 14 parts by weight of antifoam Lumiten® E-P 3108 from BASF Aktiengesellschaft and 2 parts by weight of antifoam Agitan® 281 from Munzig were combined and were mixed.

After the combination and mixing of all components, the open time was determined, i.e. the time during which the cement-containing materials are still plastically deformable without formation of cracks or solid particles in the material. An open time of >30 minutes is advantageous for the application.

In order to determine the tendency to produce odors, samples were taken directly after the preparation of the respective polymer-modified cement-containing materials and were heated in closed vessels for 30 minutes at 50° C. in a drying oven. Thereafter, an odor test was carried out and a test was performed for formation of ammonia using a moist pH paper in the gas space of the vessel.

In order to test the strength and the elasticity of the cement-containing materials obtained, cement films having a layer thickness of 2 mm when wet were produced therefrom. The films were hardened for 28 days under standard climatic conditions (23° C., 50% relative humidity). The tensile strength and elongation at break of the films were then measured on the basis of DIN 53455 by means of an automatic material tester at a take-off speed of 100 mm/min. The results of the testing of the performance characteristics are summarized in Table 2.

The monomer composition, in % by weight, of the copolymers contained in the dispersions is summarized in Table 1. There, nBa is n-butyl acrylate, S is styrene, AN is acrylonitrile, HEA is 2-hydroxyethyl acrylate, MAA is methacrylic acid, EHA is 2-ethylhexyl acrylate, MMA is methyl methacrylate, AA is acrylic acid, MAN is methacrylonitrile and AM is acrylamide.

The amount of emulsifier content, calculated as solid and based on the copolymer, was about 3% by weight in all dispersions, with the exception of ED3. The emulsifier content of the dispersion ED3 was about 1.1% by weight.

TABLE 1

| Dispersion | Monomers [% by wt] |
|---|---|
| ED1 | 70 nBA 20 S 3 AN 6 HEA 1 MAA |
| ED2 | 72.5 nBA 18 S 9 HEA 0.5 MAA |
| ED3 | 64 nBA 26 MMA 9 HEA 1 AA |
| ED4 | 38 nBA 38 EHA 19 S 5 HEA |
| ED5 | 38 nBA 34 EHA 24 S 4 HEA |
| ED6 | 34 nBA 38 EHA 25 S 3 HEA |
| VD1 | 60 EHA 15 S 15.5 AN 8 HEA 1.5 MAA |
| VD2 | 62 EHA 28 S 2.5 AN 6 AM 1.5 MAA |
| VD3 | 58 EHA 26 S 2 AN 8 HEA 6 MAA |
| VD4 | 60 EHA 28 S 2.5 AN 8 HEA 1.5 MAA |

TABLE 2

| Dispersion | Emulsifier | | | Coagulum [%] | Shear stability | Electrolyte stability [CaCl$_2$-concentration in % by weight] | Performance characteristics | | | | |
|---|---|---|---|---|---|---|---|---|---|---|---|
| | alkoxylated anionic | alkoxylated non-ionic | non-alkoxylated | | | | Water absorption [%] | Odor | Open time [min] | Tensile strength [N/mm$^2$] | Elongation at break [%] |
| ED1 | + | + | − | <0.05 | stable | 5 | 8 | faint | >30 | 2.1 | 13 |
| ED2 | + | + | − | 0.12 | stable | 2.5 | 5 | faint | >30 | 1.5 | 26 |
| ED3 | + | + | − | 0.08 | stable | 5 | 7 | faint | >30 | 1.8 | 14 |
| ED4 | + | + | − | <0.05 | stable | 5 | 10 | faint | >30 | 1.2 | 52 |
| ED5 | + | + | − | 0.09 | stable | 5 | 8 | faint | >30 | 1.4 | 48 |
| ED6 | + | + | − | 0.16 | stable | 2.5 | 8 | faint | >30 | 1.1 | 47 |
| VD1 | + | + | − | 0.10 | stable | 5 | 28 | faint | >30 | 2.6 | 7 |
| VD2 | + | + | − | 0.09 | stable | 7.5 | 21 | strong[1] | >30 | 1.9 | 14 |
| VD3 | + | + | − | 0.15 | stable | 5 | 36 | faint | 20–30 | —[2] | —[2] |
| VD4 | − | − | + | 0.09 | stable | 2.5 | 22 | faint | 5–10[3] | 1.2 | 11 |

[1]strong odor produced by emission of ammonia gas
[2]cannot be determined since material is too brittle; no strength
[3]brittle material having very low cohesion

We claim:

1. A building material, comprising:

a hydraulic binder;

from 0.5 to 150% by weight of at least one copolymer based on a dry weight of a mineral fraction of said building material;

from 0.2 to 10% by weight of a mixture of 1) at least one nonionic alkoxylated emulsifier and 2) at least one anionic alkoxylated emulsifier, based on the amount of said copolymer;

wherein said copolymer is in a form selected from the group consisting of an ammonia-free aqueous polymer dispersion, polymeric granules, polymeric powder and mixtures thereof;

wherein said polymeric granules and said polymeric powder are obtained from said ammonia-free aqueous polymer dispersion by removing at least 80% by weight of the volatile components from said ammonia-free aqueous polymer dispersion;

wherein said copolymer comprises as polymerized monomers:
  a) from 40 to 80% by weight of at least one ester of acrylic acid with a $C_2$–$C_{12}$-alkanol,
  b) from 10 to 40% by weight of i) at least one vinylaromatic monomer, ii) at least one ester of methacrylic acid with $C_1$–$C_4$-alkanols or iii) mixtures of i) and ii),
  c) from 2 to 15% by weight of at least one monoester of a $C_2$–$C_{10}$-alkanediol with acrylic acid or methacrylic acid,
  d) not more than 1.0% by weight of an ethylenically unsaturated monomer which has at least one acid group, or a salt thereof,
  e) less than 5% by weight of an ethylenically unsaturated nitrile and
  f) less than 1% by weight of an amide of a $\alpha,\beta$-ethylenically unsaturated mono-carboxylic acid or $\alpha,\beta$-ethylenically unsaturated dicarboxylic acid.

2. The building material as claimed in claim 1, wherein said nonionic alkoxylated emulsifier is selected from the group consisting of nonionic ethoxylated $C_6$–$C_{32}$-fatty alcohols having a mean degree of ethoxylation of from 2 to 150, ethoxylated $C_6$–$C_{32}$-oxo alcohols having a mean degree of ethoxylation of from 2 to 150 and ethoxylated $C_6$–$C_{32}$-alkylphenols having a mean degree of ethoxylation of from 2 to 150.

3. The building material as claimed in claim 1, wherein said anionic alkoxylated emulsifier is selected from the group consisting of 1) anionic sulfuric monoesters of ethoxylated $C_6$–$C_{32}$-fatty alcohols having a mean degree of ethoxylation of from 2 to 150 and the salts thereof, 2) anionic sulfuric monoesters of ethoxylated $C_6$–$C_{32}$-oxo alcohols having a mean degree of ethoxylation of from 2 to 150 and the salts thereof and 3) anionic sulfuric monoesters of ethoxylated $C_6$–$C_{32}$-alkylphenols having a mean degree of ethoxylation of from 2 to 150 and the salts thereof.

4. The building material as claimed in claim 1, wherein said copolymer has a transition temperature Tg below +40° C.

5. The building material as claimed in claim 1, wherein said copolymer comprises as polymerized units:
  a) from 55 to 80% by weight of at least one monomer selected from the group consisting of ethyl acrylate, n-butyl acrylate and 2-ethylhexyl acrylate,
  b) from 12 to 35% by weight of styrene, methyl methacrylate or a mixture of styrene and methyl methacrylate,
  c) from 3 to 9% by weight of at least one monoester of a $C_2$–$C_6$-alkanediol with acrylic acid or methacrylic acid, and
  d) optionally, up to 1.0% by weight of at least one ethylenically unsaturated carboxylic acid selected from the group consisting of acrylic acid, methacrylic acid, maleic acid and itaconic acid.

6. The building material as claimed in claim 1, wherein said copolymer is in the form of an aqueous polymer dispersion having a pH of from 6.7 to 8.0.

7. The building material as claimed in claim 6, wherein the pH is established by adding at least one base selected from the group consisting of alkali metal hydroxides and alkaline earth metal hydroxides.

8. The building material as claimed in claim 1, wherein a weight ratio of said copolymer and said hydraulic binder in said building material is from 0.05:1 to 2.5:1.

9. The building material as claimed in claim 1, wherein said hydraulic binder is cement.

10. A process for making the building material according to claim 1, comprising:

mixing
  said hydraulic binder,
  said copolymer;
  said emulsifier; and
  optionally, water, additives or both.

11. The building material according to claim 1, comprising no protective colloids.

12. A building material, comprising:

a hydraulic binder;

from 0.5 to 150% by weight of at least one copolymer based on a dry weight of a mineral fraction of said building material;

from 0.2 to 10% by weight of a mixture of 1) at least one nonionic alkoxylated emulsifier and 2) at least one anionic alkoxylated emulsifier, based on the amount of said copolymer;

wherein said copolymer is in a form selected from the group consisting of an ammonia-free aqueous polymer dispersion, polymeric granules, polymeric powder and mixtures thereof;

wherein said polymeric granules and said polymeric powder are obtained from said ammonia-free aqueous polymer dispersion by removing at least 80% by weight of the volatile components from said ammonia-free aqueous polymer dispersion;

wherein said copolymer comprises as polymerized monomers:
  a) from 40 to 80% by weight of at least one ester of acrylic acid with a $C_2$–$C_{12}$-alkanol,
  b) from 10 to 40% by weight of i) at least one vinylaromatic monomer, ii) at least one ester of methacrylic acid with $C_1$–$C_4$-alkanols or iii) mixtures of i) and ii),
  c) from 2 to 15% by weight of at least one monoester of a $C_2$–$C_{10}$-alkanediol with acrylic acid or methacrylic acid,
  d) not more than 1.0% by weight of an ethylenically unsaturated monomer which has at least one acid group, or a salt thereof,
  e) less than 5% by weight of an ethylenically unsaturated nitrile and
  f) less than 1% by weight of an amide of a $\alpha,\beta$-ethylenically unsaturated mono-carboxylic acid or $\alpha,\beta$-ethylenically unsaturated dicarboxylic acid;

wherein said copolymer is free of primary amido groups and nitrile groups.

* * * * *